United States Patent [19]
Maeda

[11] Patent Number: 5,208,701
[45] Date of Patent: May 4, 1993

[54] WOBBLE CORRECTION LENS WITH BINARY DIFFRACTIVE OPTIC SURFACE AND REFRACTIVE CYLINDRICAL SURFACE

[75] Inventor: Patrick Y. Maeda, Redondo Beach, Calif.

[73] Assignee: Xerox Corporation, Stamford, Conn.

[21] Appl. No.: 813,177

[22] Filed: Dec. 24, 1991

[51] Int. Cl.⁵ ............................................. G02B 27/42
[52] U.S. Cl. .................................. 359/574; 359/569; 359/741; 359/742
[58] Field of Search ............... 359/565, 566, 568, 569, 359/574, 575, 741, 742, 619, 623

[56] References Cited

U.S. PATENT DOCUMENTS

| | | | |
|---|---|---|---|
| 3,918,792 | 11/1975 | Beecher | 359/414 |
| 4,749,255 | 6/1988 | Chaurabarti et al. | 359/589 |
| 4,846,552 | 7/1989 | Veldkamp et al. | 359/900 |
| 5,016,977 | 5/1991 | Baude et al. | 359/566 |
| 5,044,706 | 9/1991 | Chen | 359/728 |
| 5,081,639 | 1/1992 | Snyder et al. | 372/101 |

OTHER PUBLICATIONS

Veldkamp et al., "Binary Optics", *Scientific American*, May 1992, pp. 92-97.
G. J. Swanson, "Binary Optics Technology: The Theory and Design of Multi-level Diffractive Optical Elements", *Massachusetts Institute of Technology Lincoln Laboratory Technical Report 854*, Aug. 14, 1989.

Primary Examiner—Bruce Y. Arnold
Assistant Examiner—J. P. Ryan
Attorney, Agent, or Firm—William Propp

[57] ABSTRACT

A wobble correction lens for a raster output scanner combines a positive cross-scan plano-cylindrical lens, which provides most of the optical power for focusing the light beam to a scan line, with a diffractive surface, which corrects the cross-scan field curvature of the cross-scan plano-cylindrical lens. The diffractive surface will have a multi-level structure (binary diffractive optical surface) which possesses a diffractive phase function that will flatten the cross-scan field curvature of the plano-cylindrical lens.

26 Claims, 2 Drawing Sheets

WOBBLE CORRECTION LENS WITH BINARY DIFFRACTIVE OPTIC SURFACE AND REFRACTIVE CYLINDRICAL SURFACE

BACKGROUND OF THE INVENTION

This invention relates to a wobble correction lens for a raster optical scanner, and, more particularly, to a wobble correction lens with a binary diffractive optic surface and a refractive cylindrical surface.

Many conventional raster optical scanners utilize a multi-faceted rotating polygon mirror as the scanning element. A collimated beam of light, as, for example, from a laser, strikes the facets of the rotating polygon which causes the reflected light to revolve about an axis near the center of rotation of the rotating polygon and scan a straight line. This reflected light can be utilized to scan a document as the input of an imaging system or can be used to impinge upon a photosensitive medium, such as a xerographic drum, as the output of an imaging system.

The post-polygon optics of the raster optical scanner are the optical elements in the optical path between the facets of the rotating polygon mirror and the scan line of the raster optical scanner.

Wobble is defined as an error in the post-polygon optics of the optical scanning system caused by the rotating facet not being exactly parallel to the vertical axis. The beam reflected from the facet is thereby angled up or down a small amount resulting in scan line displacement errors in the cross-scan direction.

The first order effect of this wobble can be removed by using a wobble correction mirror. Since, in the cross-scan plane or vertical direction, the beam is focused at the facet, and since the mirror will again focus the beam at the scan line, the angle, either up or down, will be removed. That is, if the beam is going upward a small amount, the mirror, by refocusing the beam, will bend it down an equal amount to strike the scan line at the same spot.

What slight wobble remains in the optical scanner is a second order effect caused by focusing problems. The beam, vertically, can not be focused at the facet along the entire scan line since the field is curved by the difference in glass thickness as the beam scans through thinner and thicker portions of the scan lens. To the extent that the beam is out of focus as it hits the scan line, so also will it have a small wobble at the ends of the scan line.

Angular wobble errors can be caused by several factors. The motor driving the rotating polygon mirror can vibrate during operation. The motor shaft can deviate from its rotational axis. The facets of the polygon mirror can be irregular surfaces which do not lie parallel to each other.

Extreme precision in the manufacture of the motor, motor shaft and polygon mirror can reduce wobble but not eliminate it. Such precision also increases the steps of production and makes mass production of the scanning system virtually impractical and commercially prohibitive in cost.

Another factor in the high cost of correcting wobble is the high fabrication and assembly tolerances required for the optical scanning system to work efficiently and properly.

High resolution laser optical scanner systems may have low cross-scan scan line displacement errors due to a combination of motor shaft wobble, polygon facet tilt errors, and motor vibration. These motor/polygon wobble errors produce high frequency banding which degrades the scanning quality to an unacceptable level. Wobble correction is performed optically by imaging the polygon mirror facet onto the scan plane. The facet and scan plane are geometric object-image optical conjugates formed by optical elements with power in the cross-scan direction.

Currently there are three basic types of of optical elements that are used to perform wobble correction in the post-polygon optics of the optical scanning systems: (1) a wobble correction cylindrical mirror, (2) a toroidal lens, and (3) a cylindrical lens. Each type has its own unique advantages and disadvantages. The wobble correction mirror contributes no cross-scan field curvature but imposes some mechanical constraints on the size of the optical scanning system and how the beam is folded onto the scan plane. The toroidal lens also has a flat cross-scan field and also allows greater freedom and flexibility in the optical scanning system design, and, if an external fold mirror is used, the critical optical components can be confined to a small space. However, the toroidal lens is difficult to manufacture and is therefore expensive. The cylinder lens is much easier to produce and also reduces the mechanical packaging constraints, but has a large cross-scan field curvature producing a curved scan line.

All three types of wobble correction elements rely on either reflective or refractive surfaces to perform the desired optical transformations. These surfaces may have shapes that are difficult and expensive to fabricate, and may not have all of the desired optical correction characteristics. For laser diode light sources for the optical scanning system, the waveband of light emitted is small enough so that chromatic correction is typically not required for refractive optics used with laser diode sources.

Another type of surface for an optical element uses the process of diffraction to obtain the desired optical transformation characteristics. These diffractive surfaces have surface profiles that can focus and redirect light, and can be designed to have optical correction properties that are not available with easily manufacturable refractive and reflective surface shapes. In addition, many of these diffractive surface profiles can be fabricated using a multi-level profile structure (binary diffractive optics technology) on a flat substrate. Optical elements that use diffractive surfaces are highly dispersive, more dispersive than refractive elements. In fact, they are so dispersive they cannot be used as the primary source of optical power in systems that use laser diodes for optical scanning systems.

Binary diffractive optic lenses are formed by etching or molding very shallow and precise steps or grooves into the surface of a transparent optical element. Binary diffractive optic lenses present substantial cost savings over conventional precision glass or plastic optical lenses.

It is an object of this invention to provide a type of optical element that will enable reasonable levels of wobble correction and correct cross-scan field curvature to produce a straight scan line.

It is another object of this invention to provide a more flexible and more compact optical scanning system without the high manufacturing cost associated with a toroidal lens.

It is yet another object of this invention to provide a wobble correction lens that combines a refractive cylindrical lens with a binary diffractive optic lens to correct wobble in the scan line and to correct cross-scan field curvature to produce a straight scan line.

SUMMARY OF THE INVENTION

In accordance with the present invention, a wobble correction lens for a raster output scanner combines a positive cross-scan plano-cylindrical lens, which provides most of the optical power for focusing the light beam to a scan line, with a diffractive surface, which corrects the cross-scan field curvature of the cross-scan plano-cylindrical lens. The diffractive surface will have a multi-level structure (binary diffractive optical surface) which possesses a diffractive phase function that will flatten the cross-scan field curvature of the plano-cylindrical lens.

The wobble correction lens can have a binary diffractive optic surface and a refractive cylindrical surface for a raster output scanner. The wobble correction lens can be a binary diffractive optic-plano lens bonded to a refractive plano-cylindrical lens or a wobble correction lens system can consist of the binary diffractive optic-plano lens spaced apart from refractive plano-cylindrical lens.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
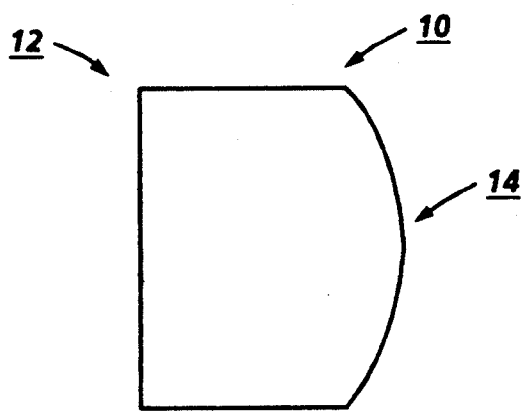
FIG. 1 is a schematic illustration of the cross-section side view of the wobble correction lens with a refractive cylindrical surface prior to forming a binary diffractive optic surface for a raster output scanner according to the present invention.

Reference is now made to FIG. 1, wherein there is illustrated a wobble correction lens 10 with a binary diffractive optic lens surface and a refractive cylindrical surface of this invention. The wobble correction lens 10 is in the optical path between the facets of the rotating polygon mirror and the scan line of the raster optical scanner (not shown).

The wobble correction lens 10 has a plano surface 12 which is flat in both the scan and cross-scan direction. Plano surface 12 is the incident surface for any scanning beam. Opposite to the plano surface 12 is a refractive cylindrical surface 14 which is positive cylindrical in the cross-scan direction. The positive cross-scan cylindrical surface 14 will focus any scanning beam to a scan line.

The wobble correction lens 10 is typically fused silica (artificial quartz). The lens may also be glass, quartz, germanium, silicon, or any material that will transmit light in the desired wavelength.

The plano surface 12 and the cylindrical surface 14 of the lens 10 are formed by conventional means such as molding or grinding.

Figure 2:
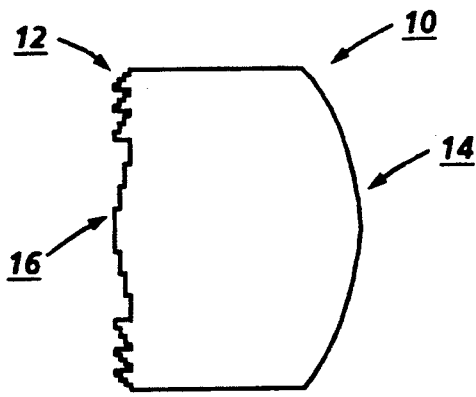
FIG. 2 is a schematic illustration of the cross-section side view of the wobble correction lens with a binary diffractive optic surface and a refractive cylindrical surface for a raster output scanner formed according to the present invention.

A binary diffractive optic lens element 16 is formed on the plano surface 12 by photolithographic etching, as shown in FIG. 2. In general, the etching process involves coating the substantially flat surface 12 with a photoresist layer, exposing the photoresist layer through a mask with the negative of the binary diffractive optic lens pattern, developing the photoresist layer and etching the surface forming the binary diffractive optic lens pattern in the surface 12 of the lens 10.

In the preferred embodiment, the surface 12 is chemically cleaned and polished. On the surface 12 of the lens 10, a mask for the binary diffractive optic lens pattern is printed on the surface using a conventional photolithographic photoresist. The non-masked areas on the surface 12 of the lens 10 are etched by reactive ion etching to fabricate the grooves or steps of the binary diffractive optic lens element 16. The reactive ion etching takes about one to twenty minutes. The etching depth depends upon the surface area exposed to the etchant. The remaining photoresist is then removed.

A possible photoresist layer is KTI 820 having a thickness of about 0.5 to 10 microns spin coated on the surface 12 of the lens 10. The masking and etching may also be made by electron beam lithography or by chemical ion etching or by ion bombardment of by UV lithography.

The only requirements for the material for the lens 10 is that the material need only transmit the wavelength desired for the scanning sytem and that the material take the pattern for the binary diffractive optic lens element 16.

The wobble correction lens 10 combines a cross-scan plano-cylindrical lens, which provides most of the optical power for focusing the light beam to a scan line, with a diffractive surface, which corrects the cross-scan field curvature of the cross-scan plano-cylindrical lens. The diffractive surface will have a multi-level structure (binary diffractive optical surface) which possesses a diffractive phase function that will flatten the cross-scan field curvature of the cross-scan plano-cylindrical lens. Used in this manner, the power of the diffractive surface will not be large enough to require chromatic correction for the wavebands of a laser diode.

The binary diffractive optic lens element 16 and the refractive cylindrical surface 14 of the wobble correction lens 10 can be coated with an antireflective coating to improve transmission of light beams.

Figure 3:
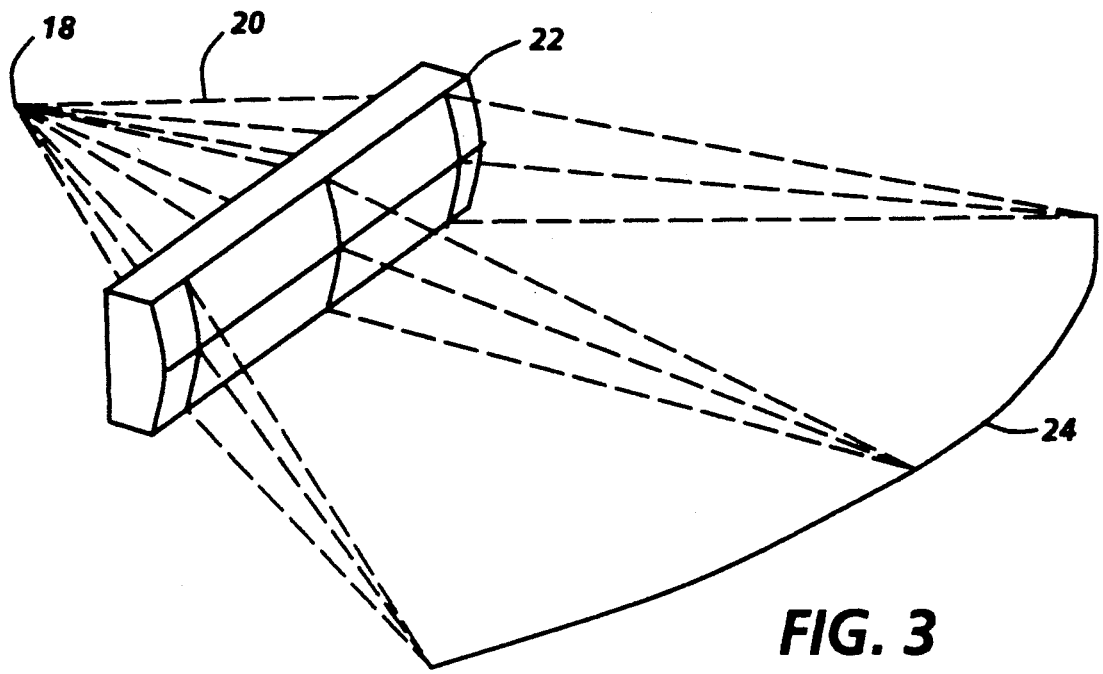
FIG. 3 is a schematic illustration of a perspective view of the cross-field line image of a prior art plano-cylindrical lens.
Figure 4:
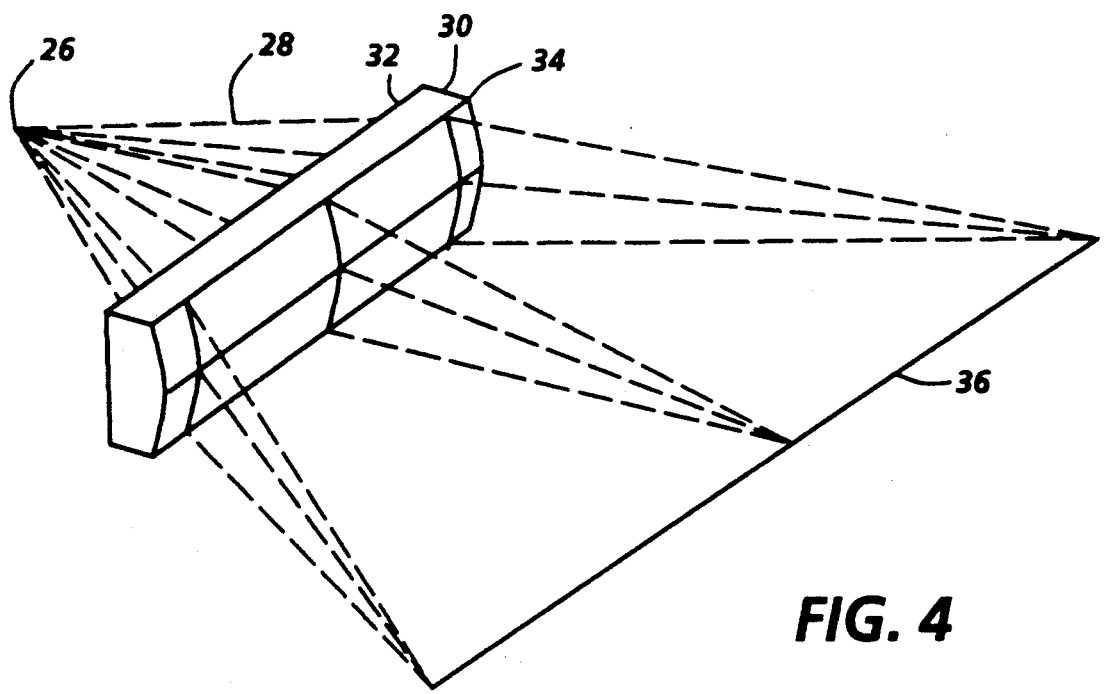
FIG. 4 is a schematic illustration of a perspective view of the cross-field line image of the wobble correction lens with a binary diffractive optic surface and a refractive cylindrical surface of FIG. 2 formed according to the present invention.

The benefits of the wobble correction lens of the present invention are shown in FIGS. 3 and 4. The rotating facets of the polygon mirror will reflect a beam of light across an arc. For ease of understanding the present invention, the optical equivalent of the rotation-reflection through an arc, a diverging point source of light is shown in FIGS. 3 and 4, to display the optical properties of the present invention.

In FIG. 3, a point source 18 emits a diverging light beam 20. A plano-cylindrical lens 22 focuses the light beam 20 in the cross-scan field to a curved scan line 24.

In FIG. 4, a point source 26 emits a diverging light beam 28. A wobble correction lens 30 with a binary diffractive optic lens surface 32 and a refractive cylindrical surface 34 focuses the light beam 28 in the cross-scan field to a straight scan line 36.

The light beam 28 is first incident on the binary diffractive optic lens surface 32 of the wobble correction lens 30, which corrects the cross-scan field curvature of the refractive cylindrical surface 34, the exit surface of the beam from the wobble correction lens, resulting in a straight scan line 36.

The performance characteristics of a wobble correction lens with a binary diffractive optic lens surface and a refractive cylindrical surface, a plano-cylinder lens with a diffractive surface on its plano face, was designed as a stand alone element imaging in the cross-scan direction at a magnification of $-2.5$ at a numerical aperture of 0.005. The results showed a diffraction limited line image for a laser diode type waveband over a fairly large scan angle (plus or minus 20 degrees) with a peak-to-peak cross-scan field curvature (measured in terms of the sag of the line image) that is less than 0.3 mm.

The wave aberration function associated with field curvature (using third-order aberration theory) consists of terms proportional to $x^2$ and $y^2$ only (the z-coordinate corresponds to the optical axis). Therefore, the diffractive phase function of the diffractive surface structure needs to be made up only of terms containing $x^2$ and $y_2$ to correct for third-order field curvature. Depending on the application requirements, correction for third-order spherical aberration may be desirable. In this case terms containing $x^4$, $x^2y^2$, and $y^4$ can also be added to the diffraction phase function. Fifth-order spherical aberration may also be corrected for by adding terms containing $x^6$, $x^4y^2$, $x^2y^4$, and $y^6$.

An alternate method of forming the binary diffractive optic lens surface on the wobble correction lens is by a conventional molding process. In general, the molding process involves pressing a mold with the negative of the binary diffractive optic lens pattern into a substantially flat, soft coating, such as a plastic or polymer or other organic material, on the plano surface of the wobble correction lens forming the binary diffractive optic lens pattern in the coating. The mold is typically nickel. The coating must be able to be mold pressed, be optically transmissive and be able to retain the binary diffractive optic lens pattern so that the lens will operate optically. The hard substrate is typically fused silica (artificial quartz). The substrate may also be glass, quartz, germanium, silicon, or any material that will transmit light in the desired wavelength.

Figure 5:
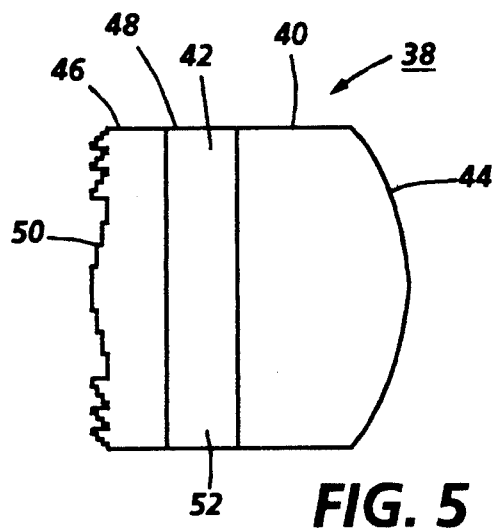
FIG. 5 is a schematic illustration of the cross-section side view of an alternate embodiment of the wobble correction lens with a binary diffractive optic surface and a refractive cylindrical surface for a raster output scanner formed according to the present invention.

The wobble correction lens 38 of FIG. 5 consists of a lens 40 with a plano or flat surface 42 and a positive cross-scan cylindrical surface 44 for focusing a beam in cross-scan plane and a lens 46 with a plano or flat surface 48 and a binary diffractive optic lens surface 50. The binary diffractive optic lens surface 50 is formed on the lens 46 by photolithography or molding as discussed previously. The plano surface of the binary diffractive optic lens 46 is bonded to the plano surface of the refractive cylindrical lens 40 by conventional bonding means 52.

The means 52 of bonding the two lenses together can typically be either by epoxy resin or by polyimide. The epoxy resin bond is approximately 2 microns thick while the polyimide bond is approximately 10 to 35 microns thick.

The viscous and liquid bonding means is applied to one plano surface 42 or 48 of either the binary diffractive optic lens or the refractive cylindrical lens only, then the substrates are aligned, pressed together, and the bonding means is cured.

Certain polyimide and thermal setting epoxy resins may require heat curing. Materials for the binary diffractive optic lens substrate and the lens cover substrate must be selected which would not be effected by the heat curing temperature. Ultraviolet setting epoxy resin is faster to set. The bonding means should be transmissive to light.

Alignment markings can be used to align the binary diffractive optic lens with the corresponding cylindrical lens. At least two alignment markings can be photolithographically produced at predetermined locations on one or both of the lenses.

The wobble correction lens 38 of FIG. 5 will correct the cross-scan field curvature and focus an incident beam of light just as the wobble correction lens 30 of FIG. 4 for a straight scan line. An incident light beam would pass through the binary diffractive optic lens surface 50 and the plano surface 48 of the binary diffractive optic-plano lens 46 first. The light beam would then pass through the bonding means 52, then through the plano surface 42 and the refractive cylindrical surface 44 of the refractive plano-cylindrical lens 40 to focus the beam on a straight scan line without cross-scan field curvature and without wobble.

Figure 6:
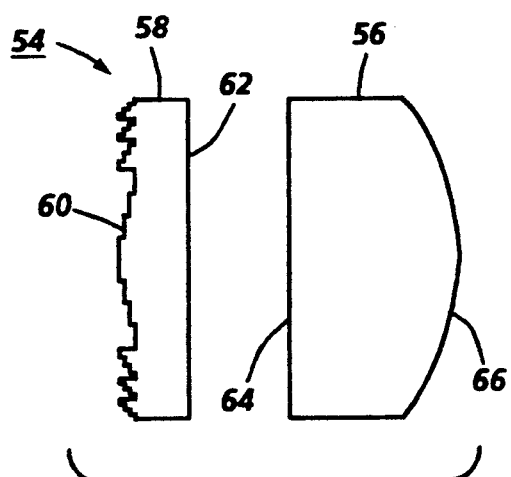
FIG. 6 is a schematic illustration of the cross-section side view of a wobble correction lens system with a binary diffractive optic lens and a refractive cylindrical lens for a raster output scanner formed according to the present invention.

The wobble correction lens system 54 of FIG. 6 consists of a binary diffractive optic-plano lens 56 and a positive cross-scan refractive plano-cylindrical lens 58. The binary diffractive optic-plano lens 56 has a binary diffractive optic lens surface 60 and a plano surface 62 formed as previously discussed. The refractive plano-cylindrical lens 58 has a plano surface 64 and a positive cross-scan refractive cylindrical surface 66. The two lens 56 and 58 of the wobble correction lens system 54 are spaced apart.

An incident light beam would pass through the binary diffractive optic lens surface 60 and the plano surface 62 of the binary diffractive optic-plano lens 56 first. The light beam would then pass through the plano surface 64 and a refractive cylindrical surface 66 of the refractive plano-cylindrical lens 58 to focus the beam on a straight scan line without cross-scan field curvature and without wobble.

The two element wobble correction system 54 of a diffractive element and a cylindrical lens would have the same properties as the single element wobble correction lens as discussed previously. This two element system may be a desirable alternative depending upon the manufacturing considerations involved in producing the diffractive surface and the cylindrical lens.

These one element wobble correction lens or two element wobble correction lens system will be used in conjunction with an f-theta scan lens (not shown) which may contribute significantly to the cross-scan field curvature of the scanning optical system. The wobble correction lens or lens system will also effect the scan linearity. Therefore, the one element wobble correction lens or two element wobble correction lens system with a binary diffractive surface and a refractive cylindrical surface should be designed and optimized with the f-theta scan lens.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical scanning system for correction of wobble and correction of cross-scan field curvature comprising:
a rotating polygon mirror with a plurality of facets,
means for generating a collimated laser beam directed onto one of said facets,
a lens which focuses said beam reflected off said one of said facets to a scan line, said lens comprising a binary diffractive optic lens surface and a refractive cylindrical surface to correct for wobble of said beam at said scan line and to correct the cross-scan field curvature of said beam at said scan line.

2. The optical scanning system for correction of wobble and correction of cross-scan field curvature of claim 1 wherein said refractive cylindrical surface is a positive cross-scan refractive cylindrical surface.

3. The optical scanning system for correction of wobble and correction of cross-scan field curvature of claim 1 wherein said binary diffractive optic lens surface is formed by photolithography.

4. The optical scanning system for correction of wobble and correction of cross-scan field curvature of claim 1 wherein said binary diffractive optic lens surface is formed by molding.

5. The optical scanning system for correction of wobble and correction of cross-scan field curvature of claim 1 wherein said binary diffractive optic lens surface and said refractive cylindrical surface are coated with an antireflective coating.

6. The optical scanning system for correction of wobble and correction of cross-scan field curvature of claim 1 wherein the surface profile of said binary diffractive optic lens surface has a diffractive phase function consisting of terms proportional to $x^2$ and $y^2$ to correct for said cross-scan field curvature.

7. The optical scanning system for correction of wobble and correction of cross-scan field curvature of claim 6 wherein said diffractive phase function also consists of terms proportional to $x^4$, $x^2y^2$, and $y^4$ to correct for third-order spherical aberration correction.

8. The optical scanning system for correction of wobble and correction of cross-scan field curvature of claim 7 wherein said diffractive phase function also consists of terms proportional to $x^6$, $x^4y^2$, $x^2y^4$, and $y^6$ to correct for fifth-order spherical aberration.

9. An optical scanning system for correction of wobble and correction of cross-scan field curvature comprising:
a rotating polygon mirror with a plurality of facets,
means for generating a collimated laser beam directed onto one of said facets,
a lens which focuses said beam reflected off said one of said facets to a scan line, said lens comprising a binary diffractive optic-plano lens, a refractive plano-cylindrical lens, and bonding means for securing said plano surface of said binary diffractive optic-plano lens to said plano surface of said refractive plano-cylindrical lens; said lens to correct for wobble of said beam at said scan line and to correct the cross-scan field curvature of said beam at said scan line.

10. The optical scanning system for correction of wobble and correction of cross-scan field curvature of claim 9 wherein said refractive plano-cylindrical lens is a positive cross-scan refractive plano-cylindrical lens.

11. The optical scanning system for correction of wobble and correction of cross-scan field curvature of claim 9 wherein said binary diffractive optic-plano lens is formed by photolithography.

12. The optical scanning system for correction of wobble and correction of cross-scan field curvature of claim 9 wherein said binary diffractive optic-plano lens is formed by molding.

13. The optical scanning system for correction of wobble and correction of cross-scan field curvature of claim 9 wherein said binary diffractive optic surface of said binary diffractive optic-plano lens and said refractive cylindrical surface of said refractive plano-cylindrical lens are coated with an antireflective coating.

14. The optical scanning system for correction of wobble and correction of cross-scan field curvature of claim 9 wherein the surface profile of said binary diffractive optic lens surface has a diffractive phase function consisting of terms proportional to $x^2$ and $y^2$ to correct for said cross-scan field curvature.

15. The optical scanning system for correction of wobble and correction of cross-scan field curvature of claim 14 wherein said diffractive phase function also consists of terms proportional to $x^4$, $x^2y^2$, and $y^4$ to correct for third-order spherical aberration correction.

16. The optical scanning system for correction of wobble and correction of cross-scan field curvature of claim 15 wherein said diffractive phase function also consists of terms proportional to $x^6$, $x^4y^2$, $x^2y^4$, and $y^6$ to correct for fifth-order spherical aberration.

17. The optical scanning system for correction of wobble and correction of cross-scan field curvature of claim 9 wherein said bonding means are an epoxy resin.

18. The optical scanning system for correction of wobble and correction of cross-scan field curvature of claim 9 wherein said bonding means are a polyimide.

19. An optical scanning system for correction of wobble and correction of cross-scan field curvature comprising:
a rotating polygon mirror with a plurality of facets,
means for generating a collimated laser beam directed onto one of said facets,
a lens system which focuses said beam reflected off said one of said facets to a scan line, said lens system comprising a binary diffractive optic-plano lens, and a refractive plano-cylindrical lens; said lens system to correct for wobble of said beam at said scan line and to correct the cross-scan field curvature of said beam at said scan line.

20. The optical scanning system for correction of wobble and correction of cross-scan field curvature of claim 19 wherein said refractive plano-cylindrical lens is a positive cross-scan refractive plano-cylindrical lens.

21. The optical scanning system for correction of wobble and correction of cross-scan field curvature of claim 19 wherein said binary diffractive optic-plano lens is formed by photolithography.

22. The optical scanning system for correction of wobble and correction of cross-scan field curvature of claim 19 wherein said binary diffractive optic-plano lens is formed by molding.

23. The optical scanning system for correction of wobble and correction of cross-scan field curvature of claim 19 wherein said surfaces of said binary diffractive optic-plano lens and said surfaces of said refractive plano-cylindrical lens are coated with an antireflective coating.

24. The optical scanning system for correction of wobble and correction of cross-scan field curvature of claim 19 wherein the surface profile of said binary diffractive optic lens surface has a diffractive phase function consisting of terms proportional to $x^2$ and $y^2$ to correct for said cross-scan field curvature.

25. The optical scanning system for correction of wobble and correction of cross-scan field curvature of claim 24 wherein said diffractive phase function also consists of terms proportional to $x^4$, $x^2y^2$, and $y^4$ to correct for third-order spherical aberration correction.

26. The optical scanning system for correction of wobble and correction of cross-scan field curvature of claim 25 wherein said diffractive phase function also consists of terms proportional to $x^6$, $x^4y^2$, $x^2y^4$, and $y^6$ to correct for fifth-order spherical aberration.

* * * * *